US008811177B1

(12) United States Patent
Toudeh-Fallah et al.

(10) Patent No.: US 8,811,177 B1
(45) Date of Patent: Aug. 19, 2014

(54) METHOD AND SYSTEM FOR IMPLEMENTING A NETWORK ANALYSIS TOOL FOR ENDPOINTS DEPLOYMENTS

(75) Inventors: Farzam Toudeh-Fallah, Westerville, OH (US); Eric Kenneth Mize, Alexandria, OH (US); Timothy J. Delamatre, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 99 days.

(21) Appl. No.: 13/471,811

(22) Filed: May 15, 2012

Related U.S. Application Data

(60) Provisional application No. 61/555,088, filed on Nov. 3, 2011.

(51) Int. Cl.
*H04B 17/00* (2006.01)
(52) U.S. Cl.
USPC .......................................... 370/235; 370/252
(58) Field of Classification Search
CPC .................. H04L 12/2439; H04L 12/2415
See application file for complete search history.

(56) References Cited

U.S. PATENT DOCUMENTS

| | | | |
|---|---|---|---|
| 4,050,375 A | 9/1977 | Orlens | |
| 5,467,391 A | 11/1995 | Donaghue, Jr. et al. | |
| 5,555,299 A | 9/1996 | Maloney et al. | |
| 5,576,951 A | 11/1996 | Lockwood | |
| 5,594,837 A | 1/1997 | Noyes | |
| 5,684,870 A | 11/1997 | Maloney et al. | |
| 5,689,698 A | 11/1997 | Jones et al. | |
| 5,740,231 A | 4/1998 | Cohn et al. | |
| 5,754,938 A | 5/1998 | Herz et al. | |
| 5,802,502 A | 9/1998 | Gell et al. | |
| 5,835,087 A | 11/1998 | Herz et al. | |
| 5,884,037 A | 3/1999 | Aras et al. | |
| 5,910,896 A | 6/1999 | Hahn-Carlson | |
| 5,923,745 A | 7/1999 | Hurd | |
| 5,933,816 A | 8/1999 | Zeanah et al. | |
| 5,987,247 A | 11/1999 | Lau | |

(Continued)

FOREIGN PATENT DOCUMENTS

| | | |
|---|---|---|
| WO | WO 01/35209 | 5/2001 |
| WO | WO 2006/060370 | 6/2006 |

OTHER PUBLICATIONS

Andersen Consulting; "Image-Based Transaction Processing: The Banking Industry's Challenge for the 1990s and Beyond;" American Bankers Association, 1989.

(Continued)

*Primary Examiner* — Asad Nawaz
*Assistant Examiner* — Jason Harley
(74) *Attorney, Agent, or Firm* — Hunton & Williams LLP

(57) ABSTRACT

According to an embodiment of the present invention, an automated computer implemented method and system for network analysis for endpoint deployment comprises determining whether a Quality of Service ("QoS") analysis based on a QoS allocation data meets a first predetermined threshold for the location; if the QoS analysis does not meet the first predetermined threshold, calculating a minimum required bandwidth and increasing link capacity to at least the minimum required bandwidth or modifying an operation mode; determining whether a bandwidth analysis meets a second predetermined threshold for the location; if the bandwidth analysis does not meet the second predetermined threshold, calculating a minimum required bandwidth and increasing link capacity to at least the minimum required bandwidth; and providing analysis results to a user interface.

16 Claims, 10 Drawing Sheets

(56) References Cited

U.S. PATENT DOCUMENTS

| | | | |
|---|---|---|---|
| 6,009,274 A | 12/1999 | Fletcher et al. | |
| 6,029,175 A | 2/2000 | Chow et al. | |
| 6,029,195 A | 2/2000 | Herz | |
| 6,058,307 A | 5/2000 | Garner | |
| 6,078,956 A | 6/2000 | Bryant et al. | |
| 6,085,976 A | 7/2000 | Sehr | |
| 6,101,479 A | 8/2000 | Shaw | |
| 6,134,530 A | 10/2000 | Bunting et al. | |
| 6,141,666 A | 10/2000 | Tobin | |
| 6,151,584 A | 11/2000 | Papierniak et al. | |
| 6,170,011 B1 | 1/2001 | Macleod Beck et al. | |
| 6,212,178 B1 | 4/2001 | Beck et al. | |
| 6,243,580 B1 | 6/2001 | Garner | |
| 6,279,039 B1 | 8/2001 | Bhat et al. | |
| 6,279,158 B1 | 8/2001 | Geile et al. | |
| 6,298,356 B1 | 10/2001 | Jawahar et al. | |
| 6,332,163 B1 | 12/2001 | Bowman-Amuah | |
| 6,404,445 B1 | 6/2002 | Galea et al. | |
| 6,405,250 B1 | 6/2002 | Lin et al. | |
| 6,438,594 B1 | 8/2002 | Bowman-Amuah | |
| 6,442,748 B1 | 8/2002 | Bowman-Amuah | |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,477,580 B1 | 11/2002 | Bowman-Amuah | |
| 6,532,284 B2 | 3/2003 | Walker et al. | |
| 6,542,739 B1 | 4/2003 | Garner | |
| 6,571,282 B1 | 5/2003 | Bowman-Amuah | |
| 6,578,068 B1 | 6/2003 | Bowman-Amuah | |
| 6,601,233 B1 | 7/2003 | Underwood | |
| 6,606,744 B1 | 8/2003 | Mikurak | |
| 6,609,658 B1 | 8/2003 | Sehr | |
| 6,640,238 B1 | 10/2003 | Bowman-Amuah | |
| 6,640,249 B1 | 10/2003 | Bowman-Amuah | |
| 6,671,818 B1 | 12/2003 | Mikurak | |
| 6,687,245 B2 | 2/2004 | Fangman et al. | |
| 6,714,987 B1 | 3/2004 | Amin et al. | |
| 6,718,535 B1 | 4/2004 | Underwood | |
| 6,725,303 B1 | 4/2004 | Hoguta et al. | |
| 6,826,716 B2 | 11/2004 | Mason | |
| 6,892,231 B2 | 5/2005 | Jager | |
| 6,895,382 B1 | 5/2005 | Srinivasan et al. | |
| 6,938,072 B2 | 8/2005 | Berman et al. | |
| 6,965,868 B1 | 11/2005 | Bednarek | |
| 7,003,565 B2 | 2/2006 | Hind et al. | |
| 7,004,382 B2 | 2/2006 | Sandru | |
| 7,010,757 B2 | 3/2006 | Stana et al. | |
| 7,020,696 B1 | 3/2006 | Perry et al. | |
| 7,047,532 B1 | 5/2006 | Connelly | |
| 7,051,199 B1 | 5/2006 | Berson et al. | |
| 7,124,101 B1 | 10/2006 | Mikurak | |
| 7,133,846 B1 | 11/2006 | Ginter et al. | |
| 7,134,075 B2 | 11/2006 | Hind et al. | |
| 7,181,419 B1 | 2/2007 | Mesaros | |
| 7,315,826 B1 | 1/2008 | Guheen et al. | |
| 7,364,086 B2 | 4/2008 | Mesaros | |
| 7,458,079 B2 | 11/2008 | Connelly | |
| 7,487,112 B2 | 2/2009 | Barnes, Jr. | |
| 7,693,748 B1 | 4/2010 | Mesaros | |
| 7,783,564 B2 | 8/2010 | Mullen et al. | |
| 2002/0004912 A1 | 1/2002 | Fung | |
| 2002/0049666 A1 | 4/2002 | Reuter et al. | |
| 2002/0069157 A1 | 6/2002 | Jordan | |
| 2002/0100803 A1 | 8/2002 | Sehr | |
| 2002/0120768 A1* | 8/2002 | Kirby et al. | 709/235 |
| 2002/0124094 A1 | 9/2002 | Chang et al. | |
| 2002/0133593 A1 | 9/2002 | Johnson et al. | |
| 2002/0138398 A1 | 9/2002 | Kalin et al. | |
| 2002/0147961 A1 | 10/2002 | Charters et al. | |
| 2002/0165754 A1 | 11/2002 | Tang et al. | |
| 2002/0188869 A1 | 12/2002 | Patrick | |
| 2002/0191548 A1 | 12/2002 | Ylonen et al. | |
| 2002/0199182 A1 | 12/2002 | Whitehead | |
| 2003/0004848 A1 | 1/2003 | Hellerstein et al. | |
| 2003/0009553 A1 | 1/2003 | Benfield et al. | |
| 2003/0018550 A1 | 1/2003 | Rotman et al. | |
| 2003/0028451 A1 | 2/2003 | Ananian | |
| 2003/0037142 A1 | 2/2003 | Munger et al. | |
| 2003/0065805 A1 | 4/2003 | Barnes, Jr. | |
| 2003/0120539 A1 | 6/2003 | Kourim et al. | |
| 2003/0144868 A1 | 7/2003 | MacIntyre et al. | |
| 2003/0149594 A1 | 8/2003 | Beazley et al. | |
| 2003/0159072 A1 | 8/2003 | Bellinger et al. | |
| 2003/0233278 A1 | 12/2003 | Marshall | |
| 2004/0039940 A1 | 2/2004 | Cox et al. | |
| 2004/0093218 A1 | 5/2004 | Bezar | |
| 2004/0111359 A1 | 6/2004 | Hudock | |
| 2004/0128186 A1 | 7/2004 | Breslin et al. | |
| 2005/0023359 A1 | 2/2005 | Saunders | |
| 2005/0097046 A1 | 5/2005 | Singfield | |
| 2005/0163047 A1* | 7/2005 | McGregor et al. | 370/229 |
| 2005/0220088 A1* | 10/2005 | Smith et al. | 370/352 |
| 2005/0288954 A1 | 12/2005 | McCarthy et al. | |
| 2006/0020783 A1 | 1/2006 | Fisher | |
| 2007/0159965 A1* | 7/2007 | Kopf et al. | 370/229 |
| 2009/0132312 A1 | 5/2009 | Reinheimer et al. | |
| 2010/0020717 A1* | 1/2010 | Mcgregor et al. | 370/252 |
| 2010/0095021 A1* | 4/2010 | Samuels et al. | 709/235 |
| 2011/0246677 A1* | 10/2011 | Johnson et al. | 710/10 |

OTHER PUBLICATIONS

Aubert, Benoit et al.; "Assessing the Risk of IT Outsourcing;" Proc. 31$^{st}$ Annual Hawaii International Conference on System Sciences; pp. 685-692; 1998.

Moore, Pat; "Critical elements of a disaster recovery and business/service continuity plan;" Journal article; Facilities, vol. 13, No. 9, pp. 22-27; ISSN: 0263-2772; Aug. 1995.

Tilley, Keith; "Work area recovery planning: the key to corporate survival;" Facilities, vol. 13, No. 9, pp. 49-53; Aug. 1995 ISSN: 0263-2772.

"Debit and Stored Value Cards for Government: A Growing Trend But States Could Do More;" efta—Electronic Funds Transfer Association; A survey and White Paper of The EBT Industry Council; Nov. 2006.

Hargreaves, Margaret et al.; "The evaluation of the expanded EBT Demonstration in Maryland;"vol. 1: System Startup, Conversion and Expansion; Final Report; Contract #53-3198-1-019; May 1994.

FOIA #09-02-12, Responsive Records, Book #3; Mar. 12, 2009.

Chakrabarti, Soumen; "Data mining for hypertext: a tutorial survey;" SIGKDD Explorations, vol. 1, Issue 2, pp. 1-11; Jan. 2000.

Cotts, David G.; "Debit Card Innovation;" LexisNexis Academic; vol. XXXV, No. 5, p. 2; May 1997.

Portner, Fred; "There must be a better way;" Mortgage Banking, vol. 53, No. 2, pp. 12-22; Nov. 1992.

VocalTec Ltd.; "Telephony Gateway—Product Overview;" Computer Telephony Solutions; 1993-1996.

Cotts, David; "The Facility Management Handbook" Second Edition; 1999.

Miller, Terrie et al.; "When custody governs;" ProQuest; Benefits Canada, vol. 22, Issue 2, pp. 33-37; Feb. 1998.

LexisNexis Academic, Debit Card Innovation, vol. XXXV, No. 5, p. 2, May 1997.

Debit and Stored Value Cards for Government: A Growing Trend but States Could Do More, A Survey and White paper of the EBT Industry Council, Electronic Funds Transfer Association (EFTA), Nov. 2006.

Hargreaves et al., The Evaluation of the Expanded EBT Demonstration in Maryland, vol. 1—System Startup, Conversion and Expansion, Final Report, Abt Associates Inc., May 1994, acs00092018.

Moore, Critical Elements of a Disaster Recovery and Business-Service Continuity Plan, Facilities, vol. 13, No. 9, 10, pp. 22-27, Aug. 1995, Dialog eLINK (Item 46 from File 15), ISSN 0263-2772.

Tilley, Work Area Recovery Planning, The Key to Corporation Survival, Facilities, vol. 13, No. 9, 10, pp. 49-53, Aug. 1995, Dialog eLINK (Item 45 from File 15), ISSN 0263-2772.

Portner, There Must be a Better Way, Mortgage Banking, vol. 53, No. 2, Nov. 1, 1992, pp. 12-22.

(56) References Cited

OTHER PUBLICATIONS

VocalTec Ltd., Telephony Gateway, Jan. 1, 1996, pp. 1-9.
Terrie Miller and Henry Yan, When Custody Governs, Benefits Canada, Toronto, Feb. 1998, vol. 22, Issue 2, p. 33, 5 pages.
Andersen Consulting, Image-based transaction processing—The banking industry's challenge for the 1990s and beyond, American Bankers Association, 1989 acs01039270.
Aubert et al., Assessing the Risk of IT Outsourcing, Proceedings of the 31st Hawaii International Conference on System Sciences, 1998, pp. 685-692.

* cited by examiner

Queue Planning Tool

Your Standard ID: XXXXXX
CRES ID of the location: 123456

Input the CURRENT device counts at the location (already installed and in use): 310

| | | |
|---|---|---|
| Telepresence Rooms – Single Screen: | 2 | 312 |
| Telepresence Rooms – 3-Screen: | 1 | 314 |

320   330

| | Conference Room Tandbergs | Desktop Tandbergs |
|---|---|---|
| Number of Tandbergs Units: | 2   322 | 2   332 |
| Codec: | 1920Kbps ▼   324 | 1920Kbps ▼   334 |

NOTE: If you are unsure which Tandberg Codec is being used, select the 1920Kbps entry.

9971 Phones: 20   340
Typical Number of Active "Click and Join" Video Streams (Adobe Connect, Webcast, etc.): 1   342

Total b/w for Other video systems at the site (include 20% bandwidth overhead): 0  Mbps   344

Input the CURRENT VoIP information for the location (already installed and in use):

Current 9971's with Call Recording: 0   346
Total Current audio-only VoIP Phones: 0   348
Voice Code: G.729   350
Current VoIP Phones with Call Recording: 0   352

Queue Planning Tool

Requestor ID: XXXXXXX
CRES ID: 123456

Input the PLANNED device counts at the location: 410

Telepresence Rooms – Single Screen: 3  412
Telepresence Rooms – 3-Screen: 1  414

|  | Conference Room Tandbergs | Desktop Tandbergs |
|---|---|---|
| Number of Tandbergs: | 2  422 | 4  432 |
| *Minimum Acceptable* Codec for this installation: | 1920Kbps  424 | 1920Kbps  434 |

420   430

Input the PLANNED Voice Over IP information:

New 9971 Phones requiring Call Recording: 0  452      Voice Codec: 0  456
Total New audio-only VoIP Phones: 0  454   New VoIP Phones requiring Call Recording: 0  458

9971 Phones: 15  440
Streams (Adobe Connect, Webcast, etc.): 1  442

Save Configuration  <-- Once you save, you will be able to email config to yourself or others.

Current devices already installed:

Telepresence Rooms - 1-Screen: 2
Telepresence Rooms - 3-Screen: 1

|  | Conference Room | Desktop |
|---|---|---|
| Number of Tandbergs: | 2 | 2 |
| Codec Setting: | 1920 Kbps | 1920 Kbps |

450

9971 Phones: 20
"Click and Join" Video Streams: 1
Other Video Systems: 0 Mbps

Figure 4

Queue Planning Tool

Input email addresses that you would like to receive this configuration: 510

512 Email address 1:

514 Email address 2:

516 Email address 3:

NOTE: You should included the email address of the GNS personnel that will be evaluating this configuration, or you should forward the email you receive to your GNS contact.

Email Configuration  <-- Click here to send this configuration to the email addresses listed above

518

Continue to inputs  <-- Click here to continue directly to the GNS page to input WAN bandwidth and utilization data for this location

520

Requestor ID: XXXXXXX
CRES ID: 123456
Assigned Configuration ID: 2011102520221615

Current devices already installed:

Telepresence Rooms - 1-Screen: 2
Telepresence Rooms - 3-Screen: 1

|  | Conference Room | Desktop |
|---|---|---|
| Number of Tandbergs: | 2 | 2 |
| Codec Setting: | 1920 Kbps | 1920 Kbps |

450

9971 Phones: 20
"Click and Join" Video Streams: 1
Other Video Systems: 0 Mbps

Planned additional devices to be installed:

Telepresence Rooms - 1-Screen: 3
Telepresence Rooms - 3-Screen: 1

|  | Conference Room | Desktop |
|---|---|---|
| Number of Tandbergs: | 2 | 4 |
| Minimum Codec Setting: | 1920 | 1920 |

530

9971 Phones: 15
"Click and Join" Video Streams: 1

Figure 5

Queue Planning Tool

Input your Standard ID and the minimum B/W currently at the site, then click to Check Queue.

Standard ID of GNS evaluator: XXXXXXX
Current Minimum WAN Bandwidth: 45    Mbps   610

Check Queue   612

Requestor ID: XXXXXXX
CRES ID: 123456
Configuration ID: 2011102520221615

| Current devices already installed: | | | Planned additional devices to be installed: | | |
|---|---|---|---|---|---|
| Telepresence Rooms - 1-Screen: 2 | | | Telepresence Rooms - 1-Screen: 3 | | |
| Telepresence Rooms - 3-Screen: 1 | | | Telepresence Rooms - 3-Screen: 1 | | |
| | Conference Room | Desktop | | Conference Room | Desktop |
| Number of Tandbergs: | 2 | 2 | Number of Tandbergs: | 2 | 4 |
| Codec Setting: | 1920 Kbps | 1920 Kbps | Minimum Codec Setting: | 1920 | 1920 |
| 9971 Phones: 20 | | | 9971 Phones: 15 | | |
| "Click and Join" Video Streams: 1 | | | "Click and Join" Video Streams: 1 | | |
| Other Video Systems: 0 Mbps | | | | | |

450 (left section), 530 (right section)

NOTE: This tool uses the QoS 2.0 standards for all calculations.

This configuration will fit within the queue at the proposed WAN bandwidth of 218 Mbps, but you must ensure that this new video load, when added to existing traffic, will not exceed WAN link capacity thresholds.

Please complete table below to check WAN capacity.

Input data from Concord for ALL existing circuits — 810

|  |  | Link 1 | Link 2 | Link 3 | Link 4 |
|---|---|---|---|---|---|
| 812 | CURRENT Link Bandwidth (Mbps): | 155 | 155 | 0 | 0 |
| 814 | Inbound Mean Percentage: | 40 | 35 | 0 | 0 |
| 816 | Inbound Std. Deviation Percentage: | 30 | 20 | 0 | 0 |
| 818 | Outbound Mean Percentage: | 20 | 15 | 0 | 0 |
| 820 | Outbound Std. Deviation Percentage: | 15 | 10 | 0 | 0 |

Check Overall Utilization — 822

GNS Evaluator ID: XXXXXXX
Requestor ID: XXXXXXX
CRES ID: 123456
Configuration ID: 20111025202221615

Current devices already installed:

Telepresence Rooms - 1-Screen: 2
Telepresence Rooms - 3-Screen: 1

450 —

|  | Conference Room | Desktop |
|---|---|---|
| Number of Tandbergs: | 2 | 2 |
| Codec Setting: | 1920 Kbps | 1920 Kbps |

9971 Phones: 20
"Click and Join" Video Streams: 1
Other Video Systems: 0 Mbps

Planned additional devices to be installed:

Telepresence Rooms - 1-Screen: 3
Telepresence Rooms - 3-Screen: 1

|  | Conference Room | Desktop |
|---|---|---|
| Number of Tandbergs: | 2 | 4 |
| Minimum Codec Setting: | 1920 | 1920 |

— 530

9971 Phones: 15
"Click and Join" Video Streams: 1

Figure 8

Queue Planning Tool

This configuration passes both video queue and WAN capacity thresholds at the proposed WAN bandwidth of <u>298</u> Mbps. ——— 1010

Warning: This configuration will work, but is only 5.0% below the link threshold so has little or no margin for additional growth.
* This configuration requires a bandwidth upgrade.
* The proposed upgrade will be sufficient: New Bandwidth: X (Current min link at site: X; Minimum bandwidth required: X Mbps
* Predicted WAN capacity margin X% below the planning thresholds.
* VIDEO call admission control (CAC) for 9971 phones: X Mbps likely available for concurrent video calls.       — 1012
* VOICE call admission control (CAC) aggregate for all VoIP call managers: X Mbps (projected usage: X Mbps.

Input email addresses below and click Confirm button to save configuration and send confirmation emails. —— 1020

Email address 1: _____ 1022

Email address 2: _____ 1024

Email address 3: _____ 1026

[ Email Configuration ]  <-- Click here to send this configuration to the email addresses listed above

1028

GNS Evaluator ID: XXXXXXX
       Requestor ID: XXXXXXX
           CRES ID: 123456
    Configuration ID: 2011102520221615

<u>Current devices already installed:</u>　　　　　<u>Planned additional devices to be installed:</u>

| | | | | | | |
|---|---|---|---|---|---|---|
| Telepresence Rooms - 1-Screen: | 2 | | | Telepresence Rooms - 1-Screen: | 3 | |
| Telepresence Rooms - 3-Screen: | 1 | | | Telepresence Rooms - 3-Screen: | 1 | |
| | Conference Room | Desktop | | | Conference Room | Desktop |
| Number of Tandbergs: | 2 | 2 | | Number of Tandbergs: | 2 | 4 |
| Codec Setting: | 1920 Kbps | 1920 Kbps | | Minimum Codec Setting: | 1920 | 1920 |
| 9971 Phones: | 20 | | | 9971 Phones: | 15 | |
| "Click and Join" Video Streams: | 1 | | | "Click and Join" Video Streams: | 1 | |
| Other Video Systems: | 0 Mbps | | | | | |

450 (left block)     530 (right block)

Concord data for existing links

| | Link 1 | Link 2 | Link 3 | Link 4 |
|---|---|---|---|---|
| Current Link Bandwidth (Mbps): | 155 | 155 | 0 | 0 |
| Inbound Mean Percentage: | 40 | 35 | 0 | 0 |

METHOD AND SYSTEM FOR IMPLEMENTING A NETWORK ANALYSIS TOOL FOR ENDPOINTS DEPLOYMENTS

CROSS REFERENCE TO RELATED APPLICATIONS

This application claims priority to provisional application, U.S. patent application No. 61/555,088, filed Nov. 3, 2011, the contents of which are incorporated herein by reference in its entirety.

FIELD OF THE INVENTION

The present invention generally relates to a system for and method of analyzing the impact of deploying various systems including video, voice and/or data on network links and providing solutions for those deployments.

BACKGROUND OF THE INVENTION

Telepresence and videoconferencing technologies allow participants in various locations to meet and have meaningful conversations. Rather than traveling in order to have face-to-face meetings, it is now common to use telepresence and videoconferencing systems, which utilize multiple codec video systems. Each participant of the meeting uses a telepresence/videoconferencing room to dial in and see/talk to every other member on screens as if they were in the same room. This technology brings time and cost benefits. As technology advances, communication features are enhanced and improved. However, such meetings require more bandwidth and resources than traditional phone calls. There are instances where the WAN links at a company site may not have enough resources to host multiple telepresence/videoconferencing meetings and thus the quality of the technology may be impaired.

Other drawbacks may also be present.

SUMMARY OF THE INVENTION

Accordingly, one aspect of the invention is to address one or more of the drawbacks set forth above. According to an embodiment of the present invention, a method and system for network analysis for endpoint deployment comprises receiving, via a user interface, current device count configuration, current bandwidth utilization data; and planned device count configuration for a location; accessing Quality of Service allocation data; determining, via a computer processor, whether a Quality of Service analysis based on the Quality of Service allocation data meets a first predetermined threshold for the location; if the Quality of Service analysis does not meet the first predetermined threshold, calculating a minimum required bandwidth and increasing link capacity to at least the minimum required bandwidth or modifying an operation mode; determining, via a computer processor, whether a bandwidth analysis meets a second predetermined threshold for the location; if the bandwidth analysis does not meet the second predetermined threshold, calculating a minimum required bandwidth and increasing link capacity to at least the minimum required bandwidth; and providing, via a user interface, analysis results comprising the minimum required capacity for each link for a plurality of links at the location, codec operation modes and a proximity of the projected total link utilization to a designated link utilization threshold level for the deployment.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 3 is an exemplary screen shot illustrating an analysis tool for endpoints deployment, according to an embodiment of the present invention.

FIG. 4 is an exemplary screen shot illustrating an analysis tool for endpoints deployment, according to an embodiment of the present invention.

FIG. 5 is an exemplary screen shot illustrating an analysis tool for endpoints deployment, according to an embodiment of the present invention.

FIG. 6 is an exemplary screen shot illustrating an analysis tool for endpoints deployment, according to an embodiment of the present invention.

FIG. 8 is an exemplary screen shot illustrating an analysis tool for endpoints deployment, according to an embodiment of the present invention.

FIG. 10 is an exemplary screen shot illustrating an analysis tool for endpoints deployment, according to an embodiment of the present invention.

DETAILED DESCRIPTION OF EXEMPLARY EMBODIMENT(S)

Figure 1:
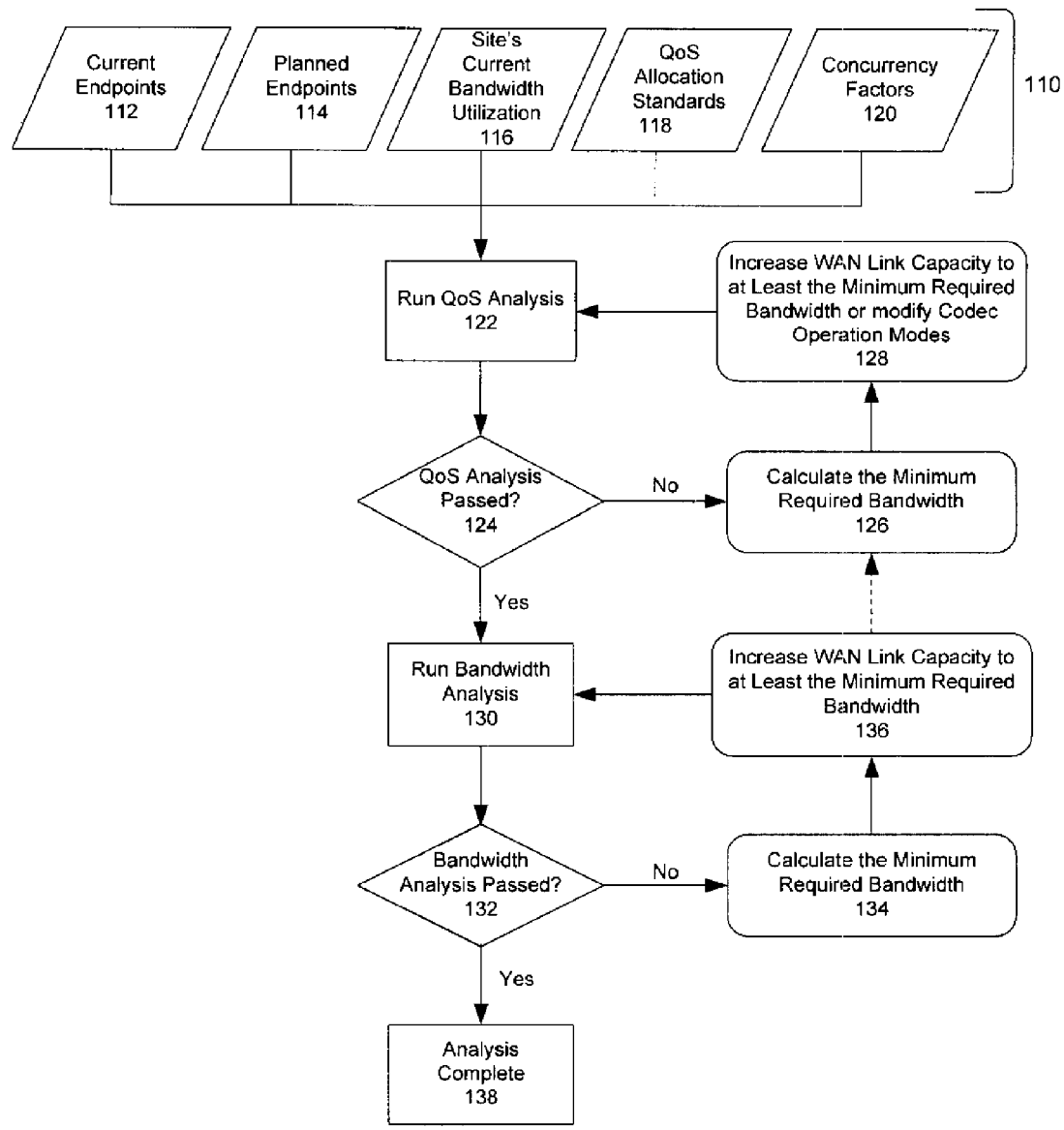
FIG. 1 is an exemplary flowchart of a method for analyzing endpoints deployment, according to an embodiment of the present invention.

An embodiment of the present invention may be directed to an automated tool for analyzing wide area network (WAN) bandwidth and Quality of Service (QoS) requirements for deploying and installing endpoint devices. The endpoint devices may support various types of traffic and information, including video, voice, data and/or various combinations and variations thereof. For example, endpoint devices may include telepresence/video-conferencing equipments, video phones, video streaming devices, voice over IP (VoIP) equipment, for example. An embodiment of the present invention automates statistically advanced calculations to streamline these deployments and ensures QoS compliance with standards while protecting traffic across the network. As recognized by the present invention, it is of critical importance to analyze the impact of deploying such devices on the WAN links before such deployments.

According to an exemplary application, a user may enter information about the current endpoints, planned endpoints, current bandwidth utilization, QoS allocation standards and/or concurrency factors. Endpoint deployment may include deployment of video, voice, data and/or various combinations and variations thereof. Using this information, an embodiment of the present invention may perform a QoS analysis to ensure that the links at the current site have enough QoS allocated. If it is determined that there is not enough, an embodiment of the present invention may then calculate a minimum required bandwidth for the QoS analysis and request the user to increase the bandwidth at the site, modify the codec operation modes and/or perform other actions associated with QoS allocation. The QoS analysis may be repeated until it is determined that there is enough QoS allocated. If it is determined that the required QoS allocation for the planned video deployments fits within the QoS allocation on the WAN links, an embodiment of the present invention may then proceed to a Bandwidth requirement analysis. If the Bandwidth requirement analysis stage is passed, the analysis is complete and the user may be presented with the codec operation modes for the video endpoints and the minimum required link capacity for the WAN links at the site for a successful deployment of the video endpoints. In addition, the proximity of the bandwidth utilization (after addition of the planned video endpoints) to the designated bandwidth threshold level and other information, as necessary, may be provided to the user. If the Bandwidth requirement analysis stage fails, the minimum required bandwidth for passing this stage may be calculated. In addition, a message may be displayed that provides information concerning how close the bandwidth utilization will be after deployment to a certain threshold. If it is close, e.g., less than 10%, a warning message may be displayed.

An embodiment of the present invention may be applied to video endpoints as well as other real time communication systems, such as telepresence systems, three screen or single screen systems, desktop telepresence and other applications and tools. Other communication systems may support video, voice, data and/or various combinations and variations thereof. Telepresence systems may refer to a high-end video-conferencing system and service usually employed by enterprise-level corporate offices. Telepresence conference rooms may include video cameras, displays, sound systems and processors, coupled with high to very high capacity bandwidth transmissions. For example, an administrator may want to ensure that employees across several locations will have adequate provisions to participate in a video meeting for an entire company. Typical uses may include one-to-one, one-to-many or many-to-many basis for personal, business, educational use, including medical applications such as diagnostic, rehabilitative and others. Educational applications may include online sessions, for example. Various applications including real time or non-real time application may be implemented in accordance with the embodiments of the present invention. In addition, an embodiment of the present invention may be applied to system and/or device upgrades for one or more sites as well as a defined subset within a site.

Information about a current site may be automatically downloaded from one or more databases. The databases may store information concerning capabilities for each of the various sites, e.g., number of users, types of equipment, inventory, network/system/device performance data, building/floor/office configuration data, user status/profile data, upgrade information, device capability information, etc.

According to another example, an embodiment of the present invention may be applied to audio, VoIP, wireless video, data, interactive data and other communication technology. While an embodiment of the present invention is described with respect to WAN links, other networks may be considered. Moreover, while the detailed description is directed to an exemplary application involving video deployment, the various embodiments of the invention may be applied to other scenarios and applications involving endpoint analysis and deployment. Other applications may be applied in varying scope.

FIG. 1 is an exemplary flowchart of a method for analyzing endpoints deployment, according to an embodiment of the present invention. While the exemplary embodiment illustrated in FIG. 1 refers to video, other types of traffic may be considered including voice, data, interactive data, video and/or various combinations and variations thereof. The system and method of an embodiment of the present invention may be applied to video systems on WAN links, Voice over IP (VoIP) deployments and other types of applications, whether real-time or non-real-time. At step 110, various inputs may be received, such as current endpoints 112, planned endpoints 114, current bandwidth utilization 116, QoS allocation standards 118 and concurrency factors 120. At step 122, a QoS analysis may be executed. At step 124, it may be determined whether the QoS analysis has been passed. If not, a minimum required bandwidth may be calculated at step 126. At step 128, an increase of WAN link capacity and/or modification of operation modes may be requested. Other action may be performed. At step 122, the QoS analysis may be executed with the modifications. If the QoS analysis is passed, a bandwidth analysis may be executed, at step 130. At step 132, it may be determined whether the bandwidth analysis has been passed. If not, a minimum required bandwidth may be calculated at step 134. At step 136, an increase of WAN link capacity and/or modification of operation modes may be requested. Other action may be performed. At step 130, the bandwidth analysis may be executed with the modifications. At step 138, the analysis ends. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

An analysis tool for video endpoints deployments may be utilized as an automated tool for analyzing the WAN bandwidth and QoS requirements for installing endpoint devices, including telepresence/video-conferencing equipments, video phones, video streaming devices, etc., at various sites and locations. An embodiment of the present invention may automate statistically advanced calculations to streamline these deployments and ensure Quality of Service (QoS) compliance with standards while protecting profit-making traffic across the network. For example, a user, such as an engineer, may input existing site parameter values and an embodiment of the present invention may automatically analyze the impact of an endpoint deployment on the network traffic, such as WAN traffic, and further provide solutions for the deployments.

As shown in FIG. 1, a user may input data for the analysis process, at step 110. The data may be inputted by the user or it may also be provided at an earlier time. For example, a user may input current information 112, such as information regarding the current video devices and other devices at the site, including, but not limited to number of those devices, their models, bandwidth usage and codec type. The user may also input planned information 114, such as information regarding the video devices and other devices planned to be added to the site, including, but not limited to number of those devices, their models, bandwidth usage and codec type. The user may provide current bandwidth information 116, such as information regarding the WAN links and their current utilization at the site.

The user may also provide QoS data 118, such as information regarding the QoS Standards/Templates governing the QoS allocations for the video traffic at the site. For example, Quality of Service Allocation rules used to define the QoS policy maps on the routers/switches, specifying percentages of the link capacity allocated to different classes of traffic. QoS data may include the rules and policies that define different classes of traffic, how they will be treated at each node (e.g., router, switch, etc.) and percentages of the total link capacity allocated to each traffic class (e.g., X % to EF class, Y % to call signaling class, etc). QoS templates may be defined for each network by the network management body.

Concurrency data 120 may be received, which may include concurrency factors for different types of video endpoints. Concurrency data may be inputted by the user or the data may be predefined. Concurrency data may include concurrency factors which may represent the probability of concurrent operation (and consequently, usage of the WAN links at the site) for different types of video devices at the site. For example, X % probability for N number of type Y of video devices at the site. Different types of methodologies for providing the required input data can be utilized. For example, the Concurrency Factor could be a simple number (e.g., 0.2 representing 20%) or it could be provided by an algorithm or any other methodologies. The concurrency factor can also be automatically calculated by a specific algorithm inside the tool based on the type and number of devices and/or other resources at the site. Concurrency factors may be entered based on the data collected on different types of video devices. An embodiment of the present invention may consider certain types of businesses that have a particularly high or low concurrency factor. For example, call centers may have much higher concurrency factors due to the high volume of calls. Some call centers may also support video so that voice and video deployment may be assessed. Also, some businesses may have high activity during night shifts, such as help centers. Other entities may have known busy seasons (e.g., time of year, certain month or months, end of year, end of fiscal year, etc.). For example, an accounting firm may have a particular high volume of activity during tax season.

Once the above-mentioned data is entered, the analysis tool of an embodiment of the present invention may run a QoS analysis, at step 122, to determine whether the required QoS allocation for the planned video deployments fits within the QoS allocation on the WAN links at the site determined by several contributing factors, including the QoS standards/template, information entered on the current and planned video endpoints at the site, information entered on the WAN links at the site, etc. If the answer is yes, the analysis tool then proceeds to the bandwidth requirement analysis stage, as shown by 130. If the answer is no, the analysis tool calculates the minimum required bandwidth for passing the QoS analysis stage, at step 126. The user may be prompted to increase the WAN link capacity by the recommended minimum required bandwidth and/or modify the codec operation modes on the planned video endpoints, at step 128. The QoS analysis again may be executed, at step 122, until it passes the QoS analysis stage.

An exemplary implementation may be based on allocating a single queue per application (e.g., video, voice or other applications). However, depending on different QoS templates, different implementations (e.g., multiple queues per application) may be conducted for this stage. The following describes an exemplary QoS analysis stage of FIG. 1 for this implementation:

$N_c$=Number of Current Video Device Categories
$N_p$=Number of Planned Video Device Categories
CVEDBR=Current Video Endpoint Device Bandwidth Requirement (based on codec operation mode and/or other factors)
CVEDCF=Current Video Endpoint Device Concurrency Factor
CNVED=Current Number of Video Endpoint Devices in a Specific Category
PVEDBR=Planned Video Endpoint Device Bandwidth Requirement (based on codec operation mode and/or other factors)
PVEDCF=Planned Video Endpoint Device Concurrency Factor
PNVED=Planned Number of Video Endpoint Devices in a Specific Category
TVEDBR=Total Video Endpoint Devices Bandwidth Requirement
MLCS=Minimum WAN Link Capacity at the Site
VCQAP=Video-Class QoS Allocation Percentage of the Link Capacity according to QoS Template
MLCR=Minimum Link Capacity Requirement $$TVEDBR = \sum_{1}^{Nc} CVEDBR_i \times CVEDCF_i \times CNVED_i + \sum_{1}^{Np} PVEDBR_j \times PVEDCF_j \times PNVED_j$$

If [TVEDBR≤(MLCS×VCQAP)]
then (QoS Check Passed and MLCR=MLCS)
else (MLCR=TVEDBR/VCQAP)

Nc represents a number of current device categories. This variable may be entered by the tool administrator based on different categories of video and other devices used by the firm. Other devices and applications may be considered. Nc may specify the categories of the video devices currently installed at the site. The categories may be based on the functionalities or models of the devices. For example, a video endpoint may be a desktop video-conferencing system or a conference-room video-conferencing system. Also, under each one of these categories, there may be different models with different types of requirements, e.g., bandwidth, codec, etc.

Np represents a number of planned device categories. This variable may be entered by the tool administrator based on different categories of video and other devices used by the firm. Other devices and applications may be considered. Np may specify the categories of the video devices planned to be installed at the site. As with the current video devices, the categories for planned video devices may be based on the functionalities or models of the devices. For example, a video endpoint may be a desktop video-conferencing system or a conference-room video-conferencing system. Also, under each one of these categories, there may be different models with different types of requirements, e.g., bandwidth, codec, etc.

CVEDBR represents the current video endpoint device bandwidth requirement, which may be based on codec operation mode and/or other factors. This variable may be entered by the tool administrator, provided as an option to the user to enter or a combination of both user and the tool administrator. This input may represent bandwidth requirement for each video endpoint device currently installed at the site, including layer 2 to 4 overheads. Other devices and applications may be considered.

CVEDCF represents the current video endpoint device concurrency factor. This variable may be entered by the tool administrator or provided as an option to the user to enter for the video devices currently installed at the site. Concurrency factors may be entered into the tool based on the data collected on different types of video devices. It represents the probability of having X number of type Y video systems to access a resource, e.g., the WAN, simultaneously. The concurrency factor may also be automatically calculated by a specific algorithm inside the tool based on the type and number of video devices at the site. Other devices and applications may be considered.

CNVED represents the current number of video endpoint devices in a specific category. This variable may be entered by the user and specifies how many devices in each video endpoint category are currently installed at the site. Other devices and applications may be considered.

PVEDBR represents planned video endpoint device bandwidth requirement which may be based on codec operation mode and/or other factors. This variable may be entered by the tool administrator or provided as an option to the user to enter or a combination of both user and the tool administrator. PVEDBR may represent bandwidth requirement for each video endpoint device planned to be installed at the site, including layer 2 to 4 overheads. Other devices and applications may be considered.

PVEDCF represents planned video endpoint device concurrency factor. This variable may be entered by the tool administrator or provided as an option to the user to enter for the video devices planned to be installed at the site. Concurrency factors may be entered into the tool based on the data collected on different types of video devices. It represents the probability of having X number of type Y video systems to access a resource, e.g., the WAN, simultaneously. The concurrency factor may also be automatically calculated by a specific algorithm inside the tool based on the type and number of video devices at the site. Other devices and applications may be considered.

PNVED represents planned number of video endpoint devices in a specific category entered by the user. This variable may specify how many devices in each video endpoint category are planned to be installed at the site. Other devices and applications may be considered.

TVEDBR represents total video endpoint devices bandwidth requirement. TVEDBR may be calculated by the tool. This variable represents the total bandwidth requirement for all the video devices (both currently installed and planned for installation) at the site. Other devices and applications may be considered.

MLCS represents minimum WAN link capacity at the site. MLCS may be entered by the user. If a site is connected via multiple WAN links to the network, this value specifies the minimum capacity among those links.

VCQAP represents video-class QoS allocation percentage of the link capacity according to QoS Template. This variable may be entered by the tool administrator. This variable specifies the percentage of the total link capacity allocated to the Video-class traffic according to the QoS template. Other devices and applications may be considered. QoS template contains the rules and policies that define different classes of traffic, how they will be treated at each node (router/switch) and percentages of the total link capacity allocated to each traffic class (e.g., X % to EF class, Y % to call signaling class, etc). QoS templates may be defined for each network by the network management body.

MLCR represents minimum link capacity requirement. MLCR may be calculated by the tool and specifies the minimum WAN link capacity at the site required to support the installation of the planned video devices.

After passing the QoS Analysis stage, using the site's current bandwidth utilization data entered by the user and other input data, the analysis tool may execute the bandwidth analysis, at step 130, to ensure the bandwidth utilization on the WAN rinks at the site, after addition of the planned video endpoints, stays below a certain threshold. If the bandwidth analysis stage is passed, the analysis is complete, at step 138, and the user is provided with the codec operation modes for the video endpoints and the minimum required link capacity for the WAN links at the site for a successful deployment of the video endpoints. Other devices and applications may be considered. In addition, the proximity of the bandwidth utilization (after addition of the planned video endpoints) to the designated bandwidth threshold level and other information, as necessary, may be provided to the user.

If the bandwidth analysis stage fails, the analysis tool may calculate the minimum required bandwidth, at step 134, for passing this stage and the user may be prompted to run the analysis again by increasing the minimum link capacity to at least the minimum required bandwidth calculated by the tool, at step 136, until this stage is passed. This iterative process may also be implemented automatically without any user intervention.

An exemplary implementation may be based on a companion links aggregate load methodology for bandwidth analysis stage. However, any bandwidth analysis methodology may be utilized for this stage. The following describes an exemplary bandwidth analysis stage of FIG. 1 for this implementation:

WLIM=WAN Link Inbound Bandwidth Utilization Mean
WLISD=WAN Link Inbound Bandwidth Utilization Standard Deviation
WLOM=WAN Link Outbound Bandwidth Utilization Mean
WLOSD=WAN Link Outbound Bandwidth Utilization Standard Deviation
IAUPVL=Inbound Aggregate Utilization plus Planned Video Load
OAUPVL=Outbound Aggregate Utilization plus Planned Video Load
$N_L$=Number of WAN links at the site $$IAUPVL = (\Sigma_1^{N_L} WLIN_i) + 1.2816([\Sigma_1^{N_L} WLISD_j^2]^{1/2}) + \Sigma_1^{N_P} PVEDBR_k \times PVEDCF_k \times PNVED_k$$

$$OAUPVL = (\Sigma_1^{N_L} WLOM_i) + 1.2816([\Sigma_1^{N_L} WLOSD_j^2]^{1/2}) + \Sigma_1^{N_P} PVEDBR_k \times PVEDCF_k \times PNVED_k$$

LUT=Link Utilization Threshold
LUM=Link Utilization Margin under the Threshold level $$\text{if}\left[\left(\left(IAUPVL \times \frac{100}{MLCR}\right) \leq (LUT - LUM) \ \& \ \left(\left(OAUPVL \times \frac{100}{MLCR}\right) \leq (LUT - LUM)\right)\right)\right]$$

then (bandwidth check is passed and MLCR is the minimum WAN bandwidth requirement at the site for adding the planned video devices)

$$\text{else}\left(MLCR = \left[\text{MAX}(IAUPVL, OAUPVL) \times \frac{100}{LUT - LUM}\right]\right)$$

WLIM represents WAN link inbound bandwidth utilization mean. This may be entered by the user and represents the statistical Mean value of the inbound bandwidth utilization for each WAN link at the site (usually obtained via the network monitoring devices).

WLISD represents WAN link inbound bandwidth utilization standard deviation. This may be entered by the user and represents the statistical Standard Deviation value of the inbound bandwidth utilization for each WAN link at the site (usually obtained via the network monitoring devices).

WLOM represents WAN link outbound bandwidth utilization mean. This may be entered by the user and represents the statistical Mean value of the outbound bandwidth utilization for each WAN link at the site (usually obtained via the network monitoring devices).

WLOSD represents WAN link outbound bandwidth utilization standard deviation. This may be entered by the user and represents the statistical Standard Deviation value of the outbound bandwidth utilization for each WAN link at the site (usually obtained via the network monitoring devices).

IAUPVL represents inbound aggregate utilization plus planned video load. This may be calculated by the tool and represents the statistical 90th percentile (or other predetermined percentage or amount) aggregate utilization of the inbound traffic running on all the WAN links at the site plus the additional traffic load generated by the planned video devices.

OAUPVL represents outbound aggregate utilization plus planned video load. This may be calculated by the tool and represents the statistical 90th percentile (or other predetermined percentage or amount) aggregate utilization of the outbound traffic running on all the WAN links at the site plus the additional traffic load generated by the planned video devices. Other devices and applications may be considered.

$N_L$ represents number of WAN links at the site. This may be entered by the user and represents the total number of WAN links at the site.

LUT represents link utilization threshold. This may be entered by the tool administrator or it may be an option to be entered by the user. LUT may represent the threshold value for each WAN link, specifying the maximum load that can be carried by a link as a percentage of the total link capacity (e.g., 80% of the total link capacity). This value may be set as a function of the link properties, e.g., link type or its capacity, etc.

LUM represents link utilization margin under the threshold level. This may be entered by the tool administrator or it may be an option to be entered by the user. This value specifies the margin value below the Link Utilization Threshold level, kept as a safety zone to avoid the total utilization to hit the Link Utilization Threshold level (e.g., 10% margin on an 80% Link Utilization Threshold).

Figure 2:
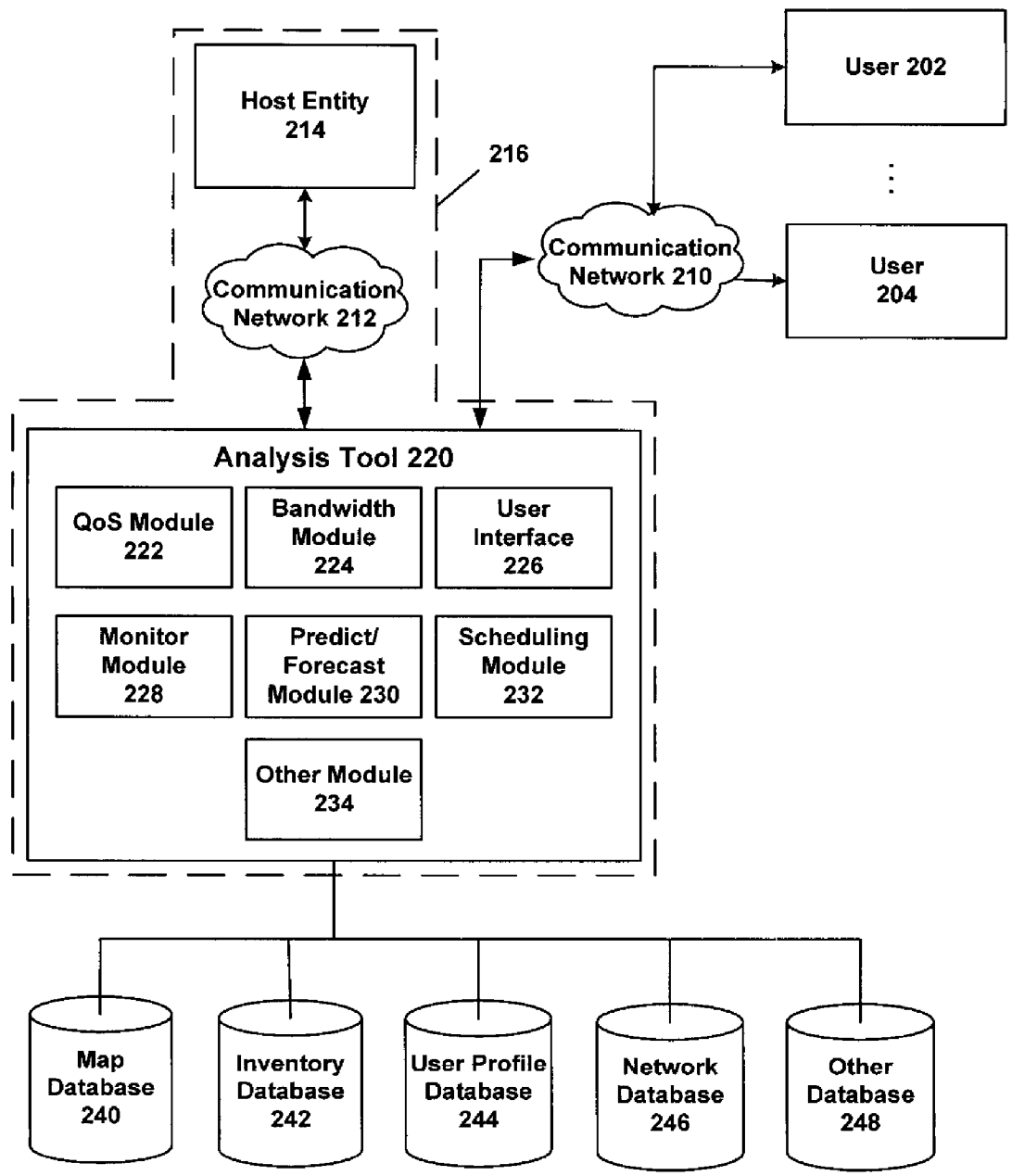
FIG. 2 is an exemplary detailed diagram of a system for analyzing endpoints deployment, according to an embodiment of the present invention.

FIG. 2 is an exemplary diagram of a system for analyzing endpoints deployment, according to an embodiment of the present invention. An embodiment of the present invention may be directed to an automated tool for analyzing the impact of deploying various systems on network links, e.g., WAN links, and providing solutions for those deployments. A system 200 of an embodiment of the present invention may include an Analysis Tool 220. The Analysis Tool 220 may be available via a web interface or other user interface. As illustrated in FIG. 2, Analysis Tool 220 may be accessed by users, including engineers, system managers and other users via a user communication device associated with a user accessing a centralized system of an embodiment of the present invention. The user may establish a communication session with a communication device via a communication network 210.

Analysis Tool 220 may be stand alone or hosted by an entity, such as a financial institution, service provider, bank, etc. For example, Analysis Tool 220 may be affiliated or associated with a host entity and/or other entity. In an exemplary embodiment involving a Host Entity 214 may host or support Analysis Tool 220. In this example, the application of endpoint deployment of an embodiment of the present invention may appear to be performed by a host entity, as a single consolidated unit, as shown by 216.

According to another example, Analysis Tool 220 may be separate and distinct from Host Entity 214. For example, Host Entity 214, or other entity, may communicate to Analysis Tool 220 via a network or other communication mechanism, as shown by Communication Network 212.

Analysis Tool 220 may access databases and/or other sources of information to perform analysis and process data. Analysis Tool 220 may access and/or maintain Map Database 240, Inventory Database 242, User Profile Database 244, Network Database 246 and Other Database 248. For example, Map Database 240 may include information relating to layout, floor plans and may further include location of employees, contractors, equipment, resources, network elements, etc. Information on each floor, team or subset may also be available. Inventory Database 242 may maintain information on equipment, devices, resources, usage, location, historical data and other device specific information. User Profile Database 244 may include information for users, preferences, privileges, etc. Network Database 246 may include information regarding specifics of the network, load, performance, demand, etc. This information may be specific for location, floor, team, etc. While a single database is illustrated in the exemplary figure, the system may include multiple databases at the same location or separated through multiple locations. The databases may be further combined and/or separated. In addition, the databases may be supported by Host Entity 214 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Analysis Tool 220 may include various modules and interfaces for analyzing the impact of deploying various systems, according to an embodiment of the present invention. Analysis Tool 220 may include QoS Module 222, Bandwidth Module 224, User Interface 226, Monitor Module 228, Predict/Forecast Module 230, Scheduling Module 232 and/or other modules, interfaces and/or processors, as represented by Other Module 234. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

QoS Module 222 may perform the QoS analysis, according to an embodiment of the present invention. The analysis tool of an embodiment of the present invention may run a QoS analysis to determine whether the required QoS allocation for the planned deployments fits within the QoS allocation on the WAN links at the site determined by several contributing factors, including the QoS standards/template, information entered on the current and planned endpoints at the site, information entered on the WAN links at the site, etc. The deployments may involve devices that support various forms of traffic and information, including video, voice, data and/or various combinations and variations thereof. Also, the links may refer to WAN links as well as other types of links and other forms of communication paths. If the answer is yes, the analysis tool then proceeds to the bandwidth requirement analysis stage. If the answer is no, the analysis tool then calculates the minimum required bandwidth for passing the QoS analysis stage. The user may be prompted to increase the WAN link capacity by the recommended minimum required bandwidth and/or modify the codec operation modes on the planned video endpoints. The QoS analysis again may be executed until it passes the QoS analysis stage.

Bandwidth Module 224 may perform the bandwidth analysis, according to an embodiment of the present invention. After passing the QoS Analysis stage, using the site's current bandwidth utilization data entered by the user and other input data, the analysis tool runs the bandwidth analysis to ensure the bandwidth utilization on the WAN links at the site, after addition of the planned endpoints, stays below a certain threshold. As discussed above, the deployments may involve devices that support various forms of traffic and information, including video, voice, data and/or various combinations and variations thereof. Also, the links may refer to WAN links as well as other types of links and other forms of communication paths. If the bandwidth analysis stage is passed, the analysis is complete and the user is provided with the codec operation modes for the endpoints and the minimum required link capacity for the WAN links at the site for a successful deployment of the endpoints. In addition, the proximity of the bandwidth utilization (after addition of the planned endpoints) to the designated bandwidth threshold level and other information, as necessary, may be provided to the user. If the bandwidth analysis stage fails, the analysis tool then calculates the minimum required bandwidth for passing this stage and the user may be prompted to run the analysis again by increasing the minimum link capacity to at least the minimum required bandwidth calculated by the tool until this stage is passed. This iterative process may also be implemented automatically without any user intervention.

According to another embodiment of the present invention, Analysis Tool 220 may host a website or other electronic interface where users may access data as well as provide data. For example, a user may submit and access information through Interface 226 to view data, submit requests, provide data and/or perform other actions. Analysis Tool 220 may communicate with various entities via communication network 210. For example, Analysis Tool 220 may receive inputs from users, shown by 202 and 204. For example, a user may schedule a company wide meeting to be streamed to the entire company. The user may desire to provision such an event before the event to see how many streams can be tolerated with the current infrastructure.

Monitor Module 228 may provide the ability to submit a real time query against a database, such as Map Database 240 and determine configuration information for a building, a segment of a building, a team, a group of buildings, a floor, user defined area, etc. The configuration information may include the type of phones, video conference equipment, computers for the designated area, etc. Additional sources of data, such as user management databases, inventory database, etc., may provide additional details for specific devices, users, etc. A network performance management database may provide utilization information for the area, users, etc. For example, a user may access real estate data, user data and inventory data from one or more databases. By accessing such information, a user may determine bandwidth data for various load capacities.

An embodiment of the present invention may assign priorities to certain types of traffic, data, conversation, video, etc. The priorities may be considered when performing QoS and/or bandwidth analysis. For example, some traffic may be considered operation mission critical. To a financial institution, the bandwidth required to process credit card transactions may have to be protected. Also, bandwidth to support telephone calls may be deemed essential. Video traffic may be considered discretionary. Also, if a company plans a video meeting, it would need to confirm that bandwidth is available prior to the meeting. In addition, a QoS analysis may be applied to video bandwidth and the video traffic. Thus, an embodiment of the present invention performs a multistep analysis that checks QoS and total bandwidth for a deployment.

Predict/Forecast Module 230 may provide feedback to the user regarding how the network is handling the current load. For example, a graphical user interface, such as a thermometer, dashboard, icon, etc., may be displayed and provide codes, including color codes indicating different status and requesting action in response. In addition, a forecasting component may also be available where moving averages or other prediction algorithm may be applied. Also, a warning or other alarm may indicate an impending critical situation that may require some type of action or acknowledgement. Also, Predict/Forecast Module 230 may include a reporting functionality where users may generate graphics, reports and view trends and historical data. A snapshot capability may capture specifics for each deployment, which may be transmitted to other users for verification and confirmation.

Scheduling Module 232 provides integration with a calendar or scheduling tool. For example, a user may set up a meeting and also have the option to select the type of meeting (e.g., conference call, video equipment, etc.) and further indicate capabilities and/or equipment needed for the meeting. A user may schedule a video conferencing meeting involving participants in different cities and countries through a scheduling tool. The scheduling tool may further indicate available bandwidth and how much more bandwidth may be needed for the proposed meeting. For example, a coordinator may schedule an office wide video conferencing meeting with participants in New York, California, London and Japan. The scheduling tool may consider the equipment at each location and determine whether there is sufficient equipment and bandwidth to support the office wide video conference. The location may be onsite or even off site. Additional specifics may be provided, such as whether the resources are limited and/or other constraints.

An embodiment of the present invention may consider privileges assigned to users, employees, members or participants. For example, different members may be given priority over others. The president of a company may be given priority over entry level employees. A company may assign employees different level of services, such as premium services, gold services and silver services, etc. For a class of video, an embodiment of the present invention may calculate how much allocation is available for each class and based on that which services are available for deployment. When the CEO makes a call to participants in a video conference, the highest quality may be provided. For an administrative status call, a standard quality may be provided. Different levels may be assigned based on subject matter. For example, meetings with clients and other external entities may be assigned a higher quality Whereas internal status meetings may be assigned a lower standard quality. Thus, privileges may be considered when performing QoS and/or bandwidth analysis.

An embodiment of the present invention may also consider limits on certain types of traffic. Within the context of voice traffic, an embodiment of the present invention may consider call admission control (CAC) values. Call admission control may prevent oversubscription VoIP networks where CAC may be based on whether the required network resources are available to provide suitable QoS for the new call. QoS may protect voice traffic from the negative effects of other voice traffic and to keep excess voice traffic off the network. Thus, CAC may regulate traffic volume in voice communications, particularly in wireless mobile networks and in VoIP. An exemplary CAC algorithm may regulate the total utilized bandwidth, the total number of calls, or the total number of packets or data bits passing a specific point per unit time. If a defined limit is reached or exceeded, a new call may be prohibited from entering the network until at least one current call terminates. CAC may also be considered for video sessions.

An embodiment of the present invention may consider certain qualities of traffic that may require additional processing and/or resources. For example, additional bandwidth may be needed to determine whether data is encrypted or not and to further decrypt and/or encrypt the data. Number of participants and their associated preferences as well as location specific data may also be considered. Other forms of data may also include interactive data, as well as data associated with social media sites, real time chat, etc.

Various applications of an embodiment of the present invention may include disaster recovery. For example, a building in New York City may experience a partial shutdown. As a result, the affected employees may need to move to a nearby office or a new location altogether. Also, certain affected employees may temporarily relocate to a part of the building that is still in operation. The analysis tool may be used to analyze the impact of having to relocate the affected employees and find a suitable location.

FIG. 3 is an exemplary screenshot illustrating an analysis tool, according to an embodiment of the present invention. FIG. 3 represents an exemplary screenshot for receiving information on current devices from a user. As shown in 310, current device count may be inputted by the user for a particular location. These may refer to devices that are already installed and in current use. The categories may be based on the functionalities or models of the devices. For example, a video endpoint might be a desktop video-conferencing system or a conference-room video-conferencing system. Also, under each one of these categories, there might be different models (provided by one or multiple vendors) with different types of requirements, e.g. bandwidth, codec, etc. In this example, an input 312 for telepresence rooms single screen and an input 314 for telepresence room 3 screen may be displayed. Other variations and types of telepresence rooms may be displayed. As shown in 320, data regarding conference room videoconferencing equipment may be received, e.g., number of units at 322 and codec at 324. Videoconferencing equipment may include servers, conferencing bridges, media processing systems, multipoint switches, recorders, cloud services, etc. As shown in 330, data regarding desktop videoconferencing equipment may be received, e.g., number of units at 332 and codec at 334. Desktop videoconferencing equipment may include desktop telepresence, mobile solutions for mobile phones and tablets, or any other desktop videoconferencing systems. Also, data regarding video enabled VOIP phones and active video streams may be received at 340 and 342, respectively. Total bandwidth for other video systems at the site may be received at 344. In addition, current VoIP information may be entered. In this exemplary illustration, current devices with call recording may be entered at 346. Total current audio only VoIP phones may be entered at 348. Voice Codec may be entered at 350. Current VoIP phones with call recording may be entered at 352. Additional inputs may be displayed to address other types of traffic and data.

FIG. 4 is an exemplary screenshot illustrating an analysis tool, according to an embodiment of the present invention. FIG. 4 represents an exemplary screenshot for receiving information on planned devices from a user. As shown in 410, planned device count may be inputted by the user for a particular location. These may refer to devices that will be installed in the future. The categories may be based on the functionalities or models of the devices. For example, a video endpoint might be a desktop video-conferencing system or a conference-room video-conferencing system. Also, under each one of these categories, there might be different models (provided by one or multiple vendors) with different types of requirements, e.g. bandwidth, codec, etc. In this example, an input 412 for telepresence rooms single screen and an input 414 for telepresence rooms 3 screen may be displayed. Other variations and types of telepresence rooms may be displayed. As shown in 420, data regarding conference room videoconferencing equipment may be received, e.g., number of units at 422 and codec at 424. As shown in 430, data regarding desktop videoconferencing equipment may be received, e.g., number of units at 432 and codec at 434. Also, data regarding video enabled VOIP phones and active video streams may be received at 440 and 442, respectively. A summary of current devices already installed may be displayed at 450. The summary may also include VoIP information. The current devices information may be entered in FIG. 3 and summarized in FIG. 4. In addition, planned VoIP information may be entered. In this exemplary illustration, planned devices with call recording may be entered at 452. Total planned audio only VoIP phones may be entered at 454. Voice Codec may be entered at 456. New VoIP phones with call recording may be entered at 458. Additional inputs may be displayed to address other types of traffic and data.

FIG. 5 is an exemplary screenshot illustrating an analysis tool, according to an embodiment of the present invention. FIG. 5 represents an exemplary screenshot for sharing configuration information with others for evaluation and informational purposes, as shown by 510. For example, contact information, including email address, phone number, mobile number and/or other information may be provided. In this example, email addresses may be provided at 512, 514 and 516. By selecting 518, configuration information may be shared. By selecting 520, the user may progress to a screen that receives bandwidth and other utilization data. A summary of current devices may be shown at 450, this information may include data received in FIG. 3. A summary of planned devices may be shown at 530, this information may include data received in FIG. 4. Summary of current and planned VoIP devices may also be displayed.

FIG. 6 is an exemplary screenshot illustrating an analysis tool, according to an embodiment of the present invention. FIG. 6 represents an exemplary screenshot for checking video queue. Current minimum WAN bandwidth (e.g., link capacity) may be provided at 610. By selecting 612, the video queue may be checked. A summary of current devices may be shown at 450, this information may include data received in FIG. 3. A summary of planned devices may be shown at 530, this information may include data received in FIG. 4. Summary of VoIP and other devices may also be displayed. As shown at 620, QoS information may be provided. Here, QoS 2.0 standards are used for calculations.

Figure 7:
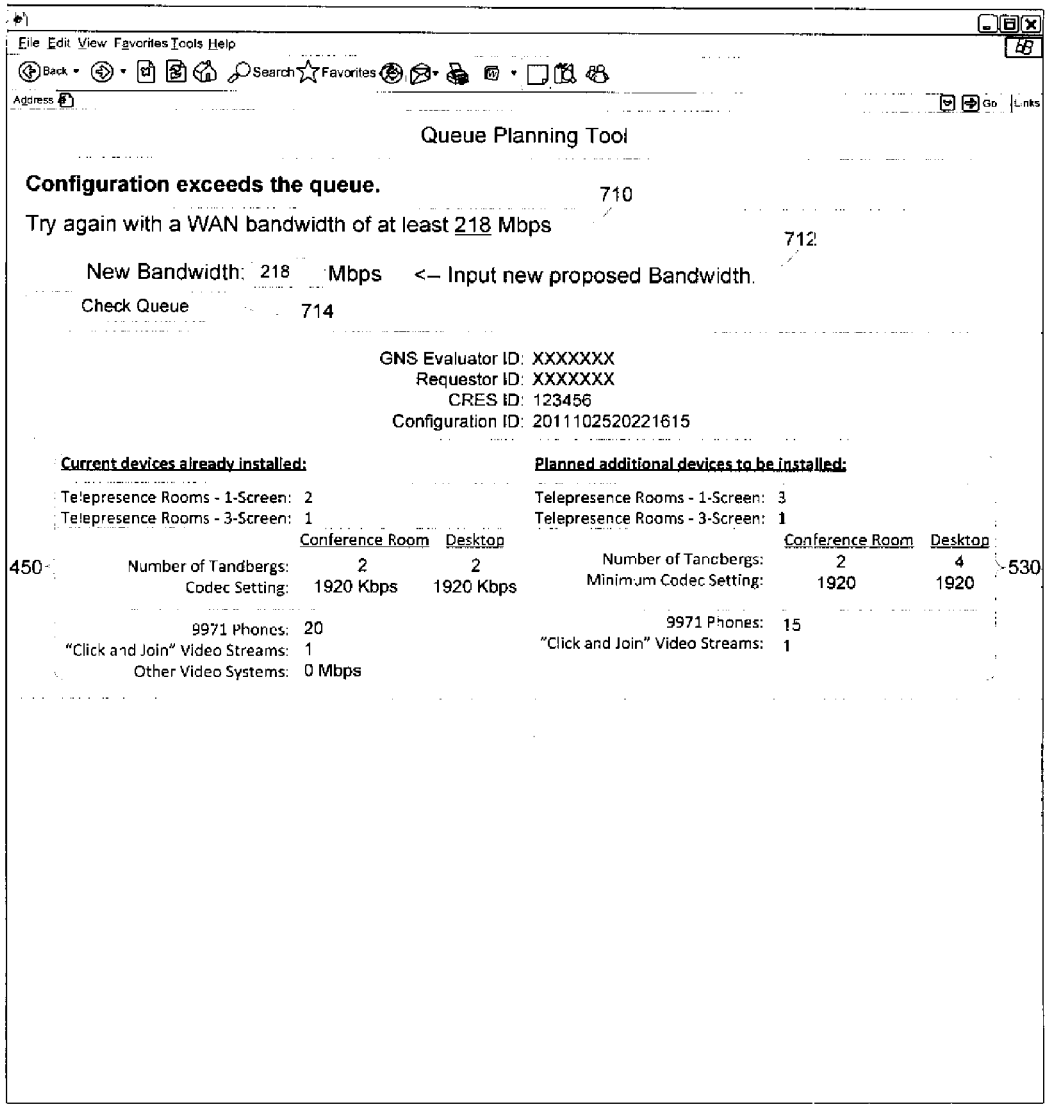
FIG. 7 is an exemplary screen shot illustrating an analysis tool for endpoints deployment, according to an embodiment of the present invention.

FIG. 7 is an exemplary screenshot illustrating an analysis tool, according to an embodiment of the present invention. FIG. 7 represents an exemplary screenshot for checking video queue when the prior entry indicates that bandwidth is insufficient. As shown at 710, a minimum WAN bandwidth is provided to the user so that the user may enter bandwidth higher than the minimum. At 712, a new bandwidth may be entered. By selecting 714, the video queue may be checked. This process may also be implemented automatically without any user intervention. A summary of current devices may be shown at 450, this information may include data received in FIG. 3. A summary of planned devices may be shown at 530, this information may include data received in FIG. 4. Summary of VoIP and other devices may also be displayed.

FIG. 8 is an exemplary screenshot illustrating an analysis tool, according to an embodiment of the present invention. FIG. 8 represents an exemplary screenshot for checking overall bandwidth utilization. A table displaying links may be shown at 810. A user may input data for all existing circuits at the site. In this example, four links are shown by Link 1, Link 2, Link 3 and Link 4. At 812, current link bandwidth may be received for each link. At 814, inbound mean percentage of link utilization may be received for each link. At 816, inbound standard deviation percentage of link utilization may be received for each link. At 818, outbound mean percentage of link utilization may be received for each link. At 820, outbound standard deviation percentage of link utilization may be received for each link. By selecting 822, overall bandwidth utilization may be checked. A summary of current devices may be shown at 450, this information may include data received in FIG. 3. A summary of planned devices may be shown at 530, this information may include data received in FIG. 4. Summary of VoIP and other devices may also be displayed.

Figure 9:
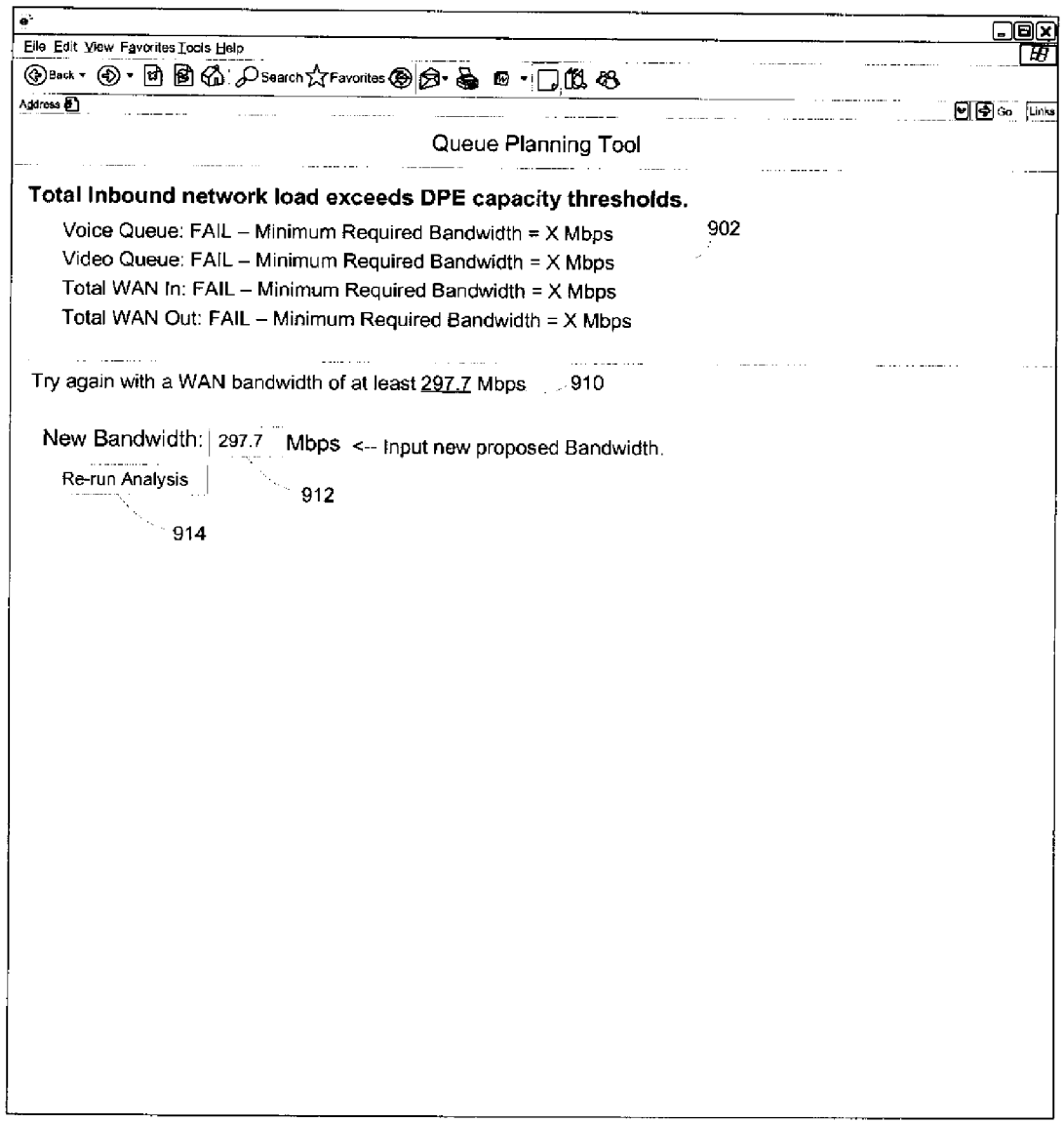
FIG. 9 is an exemplary screen shot illustrating an analysis tool for endpoints deployment, according to an embodiment of the present invention.

FIG. 9 is an exemplary screenshot illustrating an analysis tool, according to an embodiment of the present invention. FIG. 9 represents an exemplary screenshot when total inbound network load exceeds capacity thresholds. A minimum bandwidth is provided to the user, at 910. Additional details concerning why the link did not satisfy the minimum bandwidth may be provided, such as Voice Queue: FAIL; Video Queue: FAIL; Total WAN In: FAIL; Total WAN Out; FAIL with minimum requirement bandwidth for each, as shown by 902. At 912, the user is prompted to enter a new proposed bandwidth. By selecting 914, the analysis may be re-executed with the new proposed bandwidth.

FIG. 10 is an exemplary screenshot illustrating an analysis tool, according to an embodiment of the present invention. FIG. 10 represents an exemplary screenshot indicating that the configuration passed both video queue and WAN capacity thresholds for the proposed WAN bandwidth. A warning message may be displayed to indicate a percentage (or other measure of variance) below the threshold, at 1010. Additional details may be provided at 1012. A user may share configuration information with others for evaluation and informational purposes, as shown by 1020. For example, contact information, including email address, phone number, mobile number and/or other information may be provided. In this example, email addresses may be provided at 1022, 1024 and 1026. By selecting 1028, configuration information may be shared. A summary of current devices may be shown at 450, this information may include data received in FIG. 3. A summary of planned devices may be shown at 530, this information may include data received in FIG. 4. Also, a summary of existing links is shown at 1030, this information may include data received in FIG. 8. Summary of VoIP and other devices may also be displayed.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Analysis Tool 220, as shown by FIG. 2 may be stored and cataloged in Databases 240, 242, 246 and 248, which may comprise or interface with a searchable database. Databases 240, 242, 246 and 248 may comprise, include or interface to a relational database. Other databases, such as a query format database, a Standard Query Language (SQL) format database, a storage area network (SAN), or another similar data storage device, query format, platform or resource may be used. Databases 240, 242, 246 and 248 may comprise a single database or a collection of databases, dedicated or otherwise. In one embodiment, Databases 240, 242, 246 and 248 may store or cooperate with other databases to store the various data and information described herein. In some embodiments, Databases 240, 242, 246 and 248 may comprise a file management system, program or application for storing and maintaining data and information used or generated by the various features and functions of the systems and methods described herein. In some embodiments, Databases 240, 242, 246 and 248 may store, maintain and permit access to customer information, transaction information, account information, and general information used to process transactions as described herein. In some embodiments, Databases 240, 242, 246 and 248 is connected directly to Analysis Tool 220, which, in some embodiments, it is accessible through a network, such as communication network, e.g., 210, 212 illustrated in FIG. 2, for example.

Communications network, e.g., 210, 212 in FIG. 2, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 210, 212, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 and 212 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 210, 212, may comprise a satellite communications network, such as a direct broadcast communication system (DBS) having the requisite number of dishes, satellites and transmitter/receiver boxes, for example. Communications network, e.g., 210, 212, may also comprise a telephone communications network, such as the Public Switched Telephone Network (PSTN). In another embodiment, communication network 120 may comprise a Personal Branch Exchange (PBX), which may further connect to the PSTN.

In some embodiments, Analysis Tool 220 may include any terminal (e.g., a typical home or personal computer system, telephone, personal digital assistant (PDA) or other like device) whereby a user may interact with a network, such as communications network, e.g., 112. 114, for example, that is responsible for transmitting and delivering data and information used by the various systems and methods described herein. Analysis Tool 220 may include, for instance, a personal or laptop computer, a telephone, or PDA. Analysis Tool 220 may include a microprocessor, a microcontroller or other general or special purpose device operating under programmed control. Analysis Tool 220 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Analysis Tool 220 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Analysis Tool 220 may also include a network-enabled appliance, a browser-equipped or other network-enabled cellular telephone, or another TCP/IP client or other device.

As described above, FIG. 2 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method for network analysis for endpoint deployment, wherein the method is executed by a programmed computer processor which communicates with a user via a network, the method comprising the steps of:

receiving, via a user interface, current device count configuration, current bandwidth utilization data; and planned device count configuration for a site location wherein the current device count configuration comprises a combination of current telepresence room devices, conference room devices and desktop devices and wherein the planned device count configuration comprises another combination of planned telepresence room devices, conference room devices and desktop devices;

accessing Quality of Service allocation data;

determining, via a computer processor, whether a Quality of Service analysis based on the Quality of Service allocation data meets a first predetermined threshold for the location; if the Quality of Service analysis does not meet the first predetermined threshold, calculating a first minimum required bandwidth for meeting the first predetermined threshold and increasing link capacity to at least the first minimum required bandwidth or modifying an operation mode;

determining, via a computer processor, whether a bandwidth analysis meets a second predetermined threshold for the location; if the bandwidth analysis does not meet the second predetermined threshold, calculating a second minimum required bandwidth for meeting the second predetermined threshold and increasing link capacity to at least the second minimum required bandwidth; and providing, via a user interface, analysis results comprising the minimum required capacity for each link for a plurality of links at the location, codec operation modes and a proximity of the projected total link utilization to a designated link utilization threshold level for the deployment.

2. The method of claim 1, further comprising the step of: accessing concurrency factor data wherein the concurrency factor data is used in the Quality of Service and bandwidth analyses.

3. The method of claim 1, wherein current bandwidth utilization data comprises data relating to video, VoIP and other data.

4. The method of claim 1, wherein the bandwidth analysis performs an analysis based on link inbound bandwidth utilization mean, link inbound bandwidth utilization standard deviation, link outbound bandwidth utilization mean, link outbound bandwidth utilization standard deviation.

5. The method of claim 1, further comprising the step of: accessing privileges and priorities associated with a plurality of users wherein the privileges and priorities are considered in one or more of: the Quality of Service analysis and bandwidth analysis.

6. The method of claim 1, further comprising the step of: integrating a meeting scheduling tool.

7. The method of claim 1, further comprising the step of: providing a warning message when a critical threshold is reached.

8. The method of claim 1, wherein the analysis information provided via the user interface comprises proximity of the projected total link utilization to a designated link utilization threshold level.

9. An automated computer implemented system for network analysis for endpoint deployment, wherein the system comprises a user input configured to receive current device count configuration, current bandwidth utilization data; and planned device count configuration for a site location wherein the current device count configuration comprises a combination of current telepresence room devices, conference room devices and desktop devices and wherein the planned device count configuration comprises another combination of planned telepresence room devices, conference room devices and desktop devices;

a processor configured to access Quality of Service allocation data;

a QoS module configured to determine whether a Quality of Service analysis based on the Quality of Service allocation data meets a first predetermined threshold for the location; if the Quality of Service analysis does not meet the first predetermined threshold, calculating a first minimum required bandwidth for meeting the first predetermined threshold and increasing link capacity to at least the first minimum required bandwidth or modifying an operation mode;

a bandwidth analysis module configured to determine whether a bandwidth analysis meets a second predetermined threshold for the location; if the bandwidth analysis does not meet the second predetermined threshold, calculating a second minimum required bandwidth for meeting the second predetermined threshold and increasing link capacity to at least the second minimum required bandwidth; and a user interface configured to provide analysis results comprising the minimum required capacity for each link for a plurality of links at the location, codec operation modes and a proximity of the projected total link utilization to a designated link utilization threshold level for the deployment.

10. The system of claim 9, wherein the processor is further configured to access concurrency factor data wherein the concurrency factor data is used in the Quality of Service and bandwidth analyses.

11. The system of claim 9, wherein current bandwidth utilization data comprises data relating to video, VoIP and other data.

12. The system of claim 9, wherein the bandwidth analysis performs an analysis based on link inbound bandwidth utilization mean, link inbound bandwidth utilization standard deviation, link outbound bandwidth utilization mean, link outbound bandwidth utilization standard deviation.

13. The system of claim 9, wherein the processor is further configured to access privileges and priorities associated with a plurality of users wherein the privileges and priorities are considered in one or more of: the Quality of Service analysis and bandwidth analysis.

14. The system of claim 9, further comprising a meeting scheduling tool.

15. The system of claim 9, wherein the user interface is further configured to provide a warning message when a critical threshold is reached.

16. The system of claim 9, wherein the analysis information provided via the user interface comprises proximity of the projected total link utilization to a designated link utilization threshold level.

* * * * *